United States Patent
Hossick-Schott

(10) Patent No.: US 12,170,388 B2
(45) Date of Patent: Dec. 17, 2024

(54) ELECTROLYTE ADDITIVE IN PRIMARY BATTERIES FOR MEDICAL DEVICES

(71) Applicant: Medtronic, Inc., Minneapolis, MN (US)

(72) Inventor: Joachim Hossick-Schott, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 484 days.

(21) Appl. No.: 17/608,098

(22) PCT Filed: Feb. 19, 2020

(86) PCT No.: PCT/US2020/018805
§ 371 (c)(1),
(2) Date: Nov. 1, 2021

(87) PCT Pub. No.: WO2020/222893
PCT Pub. Date: Nov. 5, 2020

(65) Prior Publication Data
US 2022/0320529 A1 Oct. 6, 2022

Related U.S. Application Data

(60) Provisional application No. 62/841,995, filed on May 2, 2019.

(51) Int. Cl.
*H01M 6/00* (2006.01)
*H01M 4/38* (2006.01)
(Continued)

(52) U.S. Cl.
CPC .......... *H01M 6/166* (2013.01); *H01M 4/382* (2013.01); *H01M 6/164* (2013.01); *H01M 6/168* (2013.01);
(Continued)

(58) Field of Classification Search
CPC ............ H01M 6/16; H01M 4/38; H01M 6/18; H01M 4/382; H01M 6/166; H01M 6/164; H01M 6/168
See application file for complete search history.

(56) References Cited

U.S. PATENT DOCUMENTS

| | | |
|---|---|---|
| 6,174,629 B1 | 1/2001 | Gan et al. |
| 6,586,135 B2 | 7/2003 | Gan et al. |

(Continued)

FOREIGN PATENT DOCUMENTS

| | | |
|---|---|---|
| CN | 1407649 A | 4/2003 |
| CN | 101065864 A | 10/2007 |

(Continued)

OTHER PUBLICATIONS

International Preliminary Report on Patentability from International Application No. PCT/US2020/018805, dated Nov. 11, 2021, 6 pp.

(Continued)

*Primary Examiner* — Cynthia H Kelly
*Assistant Examiner* — Monique M Wills
(74) *Attorney, Agent, or Firm* — Shumaker & Sieffert, P.A.

(57) ABSTRACT

A battery for an implantable medical device (IMD) configured to support a relatively high rate of energy discharge relative to its capacity to support energy intensive therapy delivery, such as high energy anti-tachyarrhythmia shocks, by the IMD. The battery includes a first electrode, a second electrode separated a distance from the first electrode, an electrolyte disposed between the first electrode and the second electrode. The electrolyte includes a lithium salt including LiAsF6, an organic solvent, and an electrolyte additive that includes vinylene carbonate.

19 Claims, 7 Drawing Sheets

(51) Int. Cl.
*H01M 6/16* (2006.01)
*H01M 6/18* (2006.01)
(52) U.S. Cl.
CPC ...... *H01M 6/18* (2013.01); *H01M 2300/0037* (2013.01)

(56) References Cited

U.S. PATENT DOCUMENTS

| | | | |
|---|---|---|---|
| 8,535,834 B1 * | 9/2013 | Yoon | H01G 11/62 |
| | | | 429/322 |
| 2003/0113634 A1 | 6/2003 | Oh et al. | |
| 2008/0038643 A1 | 2/2008 | Krehl et al. | |
| 2018/0169421 A1 * | 6/2018 | Chen | A61B 5/361 |

FOREIGN PATENT DOCUMENTS

| | | |
|---|---|---|
| CN | 102934264 A | 2/2013 |
| CN | 105870502 A | 8/2016 |
| CN | 108461715 A | 8/2018 |
| EP | 1022797 A1 | 7/2000 |
| EP | 1816692 A1 | 8/2007 |
| WO | 2011154692 A1 | 12/2011 |

OTHER PUBLICATIONS

Office Action from counterpart Chinese Application No. 202080032838.2 dated Jun. 20, 2023, and English translation thereof, 15 pp.
Brown et al., "Investigation of the Lithium Solid Electrolyte Interphase in Vinylene Carbonate Electrolytes Using Cu∥ LiFePO4 Cells," Journal of The Electrochemical Society, vol. 164, No. 9, Jul. 2017, 4 pp.
Chikina et al., "Seebeck effect in electrolytes," Physical Review E, vol. 86, No. 1, Jul. 2012, 7 pp.
Ding et al., "Dendrite-Free Lithium Deposition via Self-Healing Electrostatic Shield Mechanism," Journal of the American Chemical Society, vol. 135, No. 11, Feb. 2013, 7 pp.
Ding et al., "Effects of Carbonate Solvents and Lithium Salts on Morphology and Coulombic Efficiency of Lithium Electrode," Journal of The Electrochemical Society, vol. 160, No. 10, Sep. 2013, 8 pp.
Downie et al., "The Impact of Electrolyte Additives Determined Using Isothermal Microcalorimetry," ECS Electrochemistry Letters, vol. 2, No. 10, Jul. 2013, 4 pp.
Haruna et al., "Accurate Consumption Analysis of Vinylene Carbonate as an Electrolyte Additive in an 18650 Lithium-Ion Battery at the First Charge-Discharge Cycle," Journal of The Electrochemical Society, vol. 164, No. 1, Dec. 2016, 3 pp.
Michan et al., "Fluoroethylene Carbonate and Vinylene Carbonate Reduction: Understanding Lithium-ion Battery Electrolyte Additives and Solid Electrolyte Interphase Formation," Chemistry of Materials, vol. 28, No. 22, Oct. 2016, 13 pp.
Mogi et al., "Effects of Some Organic Additives on Lithium Deposition in Propylene Carbonate," Journal of The Electrochemical Society, vol. 149, No. 12, Oct. 2002, 6 pp.
Nie et al., "Effect of Vinylene Carbonate and Fluoroethylene Carbonate on SEI Formation on Graphitic Anodes in Li-Ion Batteries," Journal of The Electrochemical Society, vol. 162, No. 13, Jul. 2015, 7 pp.
Ota et al., "Effect of vinylene carbonate as additive to electrolyte for lithium metal anode," Electrochimica Acta, vol. 49, No. 4, Feb. 2004, 8 pp.
Pappenfus et al., "Polyelectrolyte Composite Materials with LiPF6 and Tetraglyme," Electrochemical and Solid-State Letters, vol. 7, No. 8, Jun. 2004, 2 pp.
Quatani et al., "Effect of Vinylene Carbonate Additive in Li-Ion Batteries: Comparison of LiCoO2/C, LiFePO4/C, and LiCoO2/Li4Ti5O12 Systems," Journal of The Electrochemical Society, vol. 156, No. 6, Apr. 2009, 10 pp.
Quatani et al., "The Effect of Vinylene Carbonate Additive on Surface Film Formation on Both Electrodes in Li-Ion Batteries," Journal of The Electrochemical Society, vol. 156, No. 2, Dec. 2008, 11 pp.
Ren et al., "Guided Lithium Metal Deposition and Improved Lithium Coulombic Efficiency through Synergistic Effects of LiAsF6 and Cyclic Carbonate Additives," ACS Energy Letters, vol. 3, 2018, published Nov. 2017, 6 pp.
Schmid et al., "Concentration Effects on the Entropy of Electrochemical Lithium Deposition: Implications for Li+ Solvation," The Journal of Physical Chemistry B, vol. 119, No. 42, Sep. 2015, 6 pp.
Schmid et al., "Microcalorimetric Measurements of the Solvent Contribution to the Entropy Changes upon Electrochemical Lithium Bulk Deposition," Angewandte Chemie International Edition, vol. 52, No. 50, Dec. 2013, 5 pp.
Zhang et al., "Advances in Interfaces between Li Metal Anode and Electrolyte," Advanced Materials Interfaces, vol. 5, No. 2, Jan. 2018, published Dec. 2017, 19 pp.
Zhang et al., "Electrochemical and Infrared Studies of the Reduction of Organic Carbonates," Journal of The Electrochemical Society, vol. 148, No. 12, Nov. 2001, 5 pp.
Zhang et al., "Role of 1,3-Propane Sultone and Vinylene Carbonate in Solid Electrolyte Interface Formation and Gas Generation," Journal of Physical Chemistry C, vol. 119, No. 21, Apr. 2015, 12 pp.
International Search Report and Written Opinion of International Application No. PCT/US2020/018805, mailed Apr. 17, 2020, 11 pp.
Second Office Action and Search Report, and translation thereof, from counterpart Chinese Application No. 202080032838.2 dated Jan. 9, 2024, 15 pp.
Third Office Action, and translation thereof, from counterpart Chinese Application No. 202080032838.2 dated May 16, 2024, 15 pp.

* cited by examiner

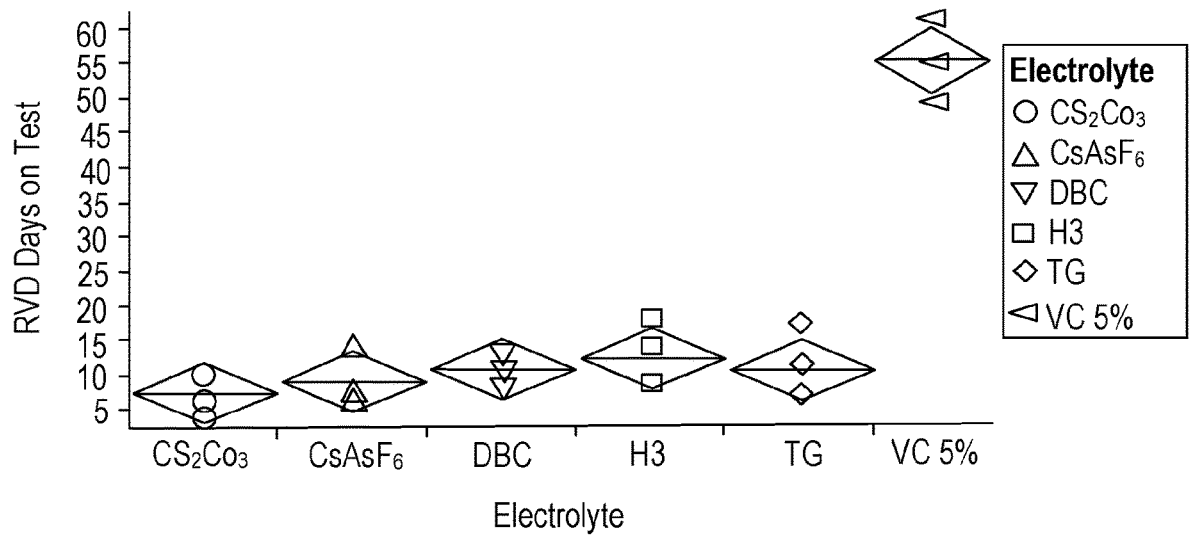
FIG. 6A
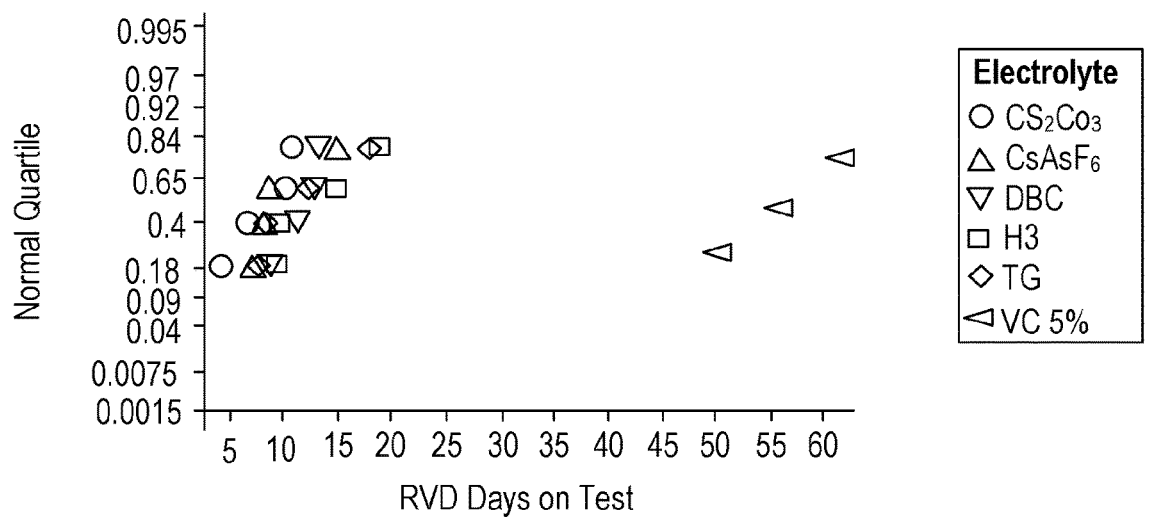
FIG. 6B
| Level | Number | Mean | Std Error |
|---|---|---|---|
| CS₂Co₃ | 4 | 7.7446 | 2.0281 |
| CsAsF₆ | 4 | 9.3480 | 2.0281 |
| DBC | 4 | 11.2137 | 2.0281 |
| H3 | 4 | 12.8041 | 2.0281 |
| TG | 4 | 11.2309 | 2.0281 |
| VC 5% | 3 | 55.7486 | 2.4318 |
FIG. 6C

ELECTROLYTE ADDITIVE IN PRIMARY BATTERIES FOR MEDICAL DEVICES

This application is a national stage of International Application No. PCT/US2020/018805, filed on Feb. 19, 2020, which claimed priority from U.S. Provisional Application Ser. No. 62/841,995, filed on May 2, 2019, the entire content of each of which is incorporated herein by reference.

TECHNICAL FIELD

This disclosure relates to primary batteries, such as high rate primary batteries, used in medical devices.

BACKGROUND

Medical devices such as implantable medical devices (IMDs) include a variety of devices that deliver therapy (such as electrical simulation or drug delivery) to a patient, monitor a physiological parameter of a patient, or both. IMDs typically include a number of functional components encased in a housing. The housing is implanted in a body of the patient. For example, the housing may be implanted in a pocket created in a torso of a patient. The housing may include various internal components such as batteries, capacitors and/or other circuitry to deliver electrical energy as therapy to a patient, and/or sensors and signal processing circuitry for monitoring a physiological parameter of a patient.

SUMMARY

In general, the disclosure is directed to a battery for a medical device, such as an IMD, and techniques for manufacturing the battery. The battery may include a high-rate primary battery having a lithium metal anode, solid electrolyte interface (SEI) layer, and an electrolyte that includes one or more electrolyte additives configured to reduce or eliminate the extremely rare occurrence of rapid voltage decline (RVD). Primary lithium ion batteries include non-rechargeable cells having lithium metal anode. High-rate primary lithium ion batteries may be configured to discharge at a higher rate compared to other primary lithium ion batteries. In extremely rare occasions in primary high-rate batteries, RVD may be due to short circuit caused by formation of lithium dendrites. To reduce or eliminate RVD, the one or more electrolyte additives may be used to change the lithium ion flow kinetics through the solid electrolyte interface (SEI) layer and thereby the structure of the plated lithium. In some examples, the one or more electrolyte additives may increase the useable life of the battery.

In some examples, a high-rate primary battery for an IMD may include a first electrode, a second electrode separated a distance from the first electrode, an electrolyte disposed between the first electrode and the second electrode. The electrolyte may include a lithium salt including $LiAsF_6$, an organic solvent, and an electrolyte additive that includes vinylene carbonate.

In some examples, a medical device may include an outer housing and a high-rate primary battery within the outer housing. The high-rate primary battery may be configured to supply power to one or more electronic components of the medical device. The high-rate primary battery may include a first electrode, a second electrode separated a distance from the first electrode, and an electrolyte disposed between the first electrode and the second electrode. The electrolyte may include a lithium salt including $LiAsF_6$, an organic solvent, and an electrolyte additive that includes vinylene carbonate.

In some examples, a method of assembling a battery may include forming a high-rate primary battery cell including a first electrode and a second electrode separated a distance from the first electrode, and exposing the first electrode and the second electrode to an electrolyte. The electrolyte may include a lithium salt including $LiAsF_6$, an organic solvent, and an electrolyte additive that includes vinylene carbonate.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF THE DRAWINGS

FIGS. 6A-6C are conceptual diagrams illustrating experimental results including the time-to-failure ("RVD Days on Test") as a function of the type of electrolyte mixture used to fill the batteries.

DETAILED DESCRIPTION

Figure 1:
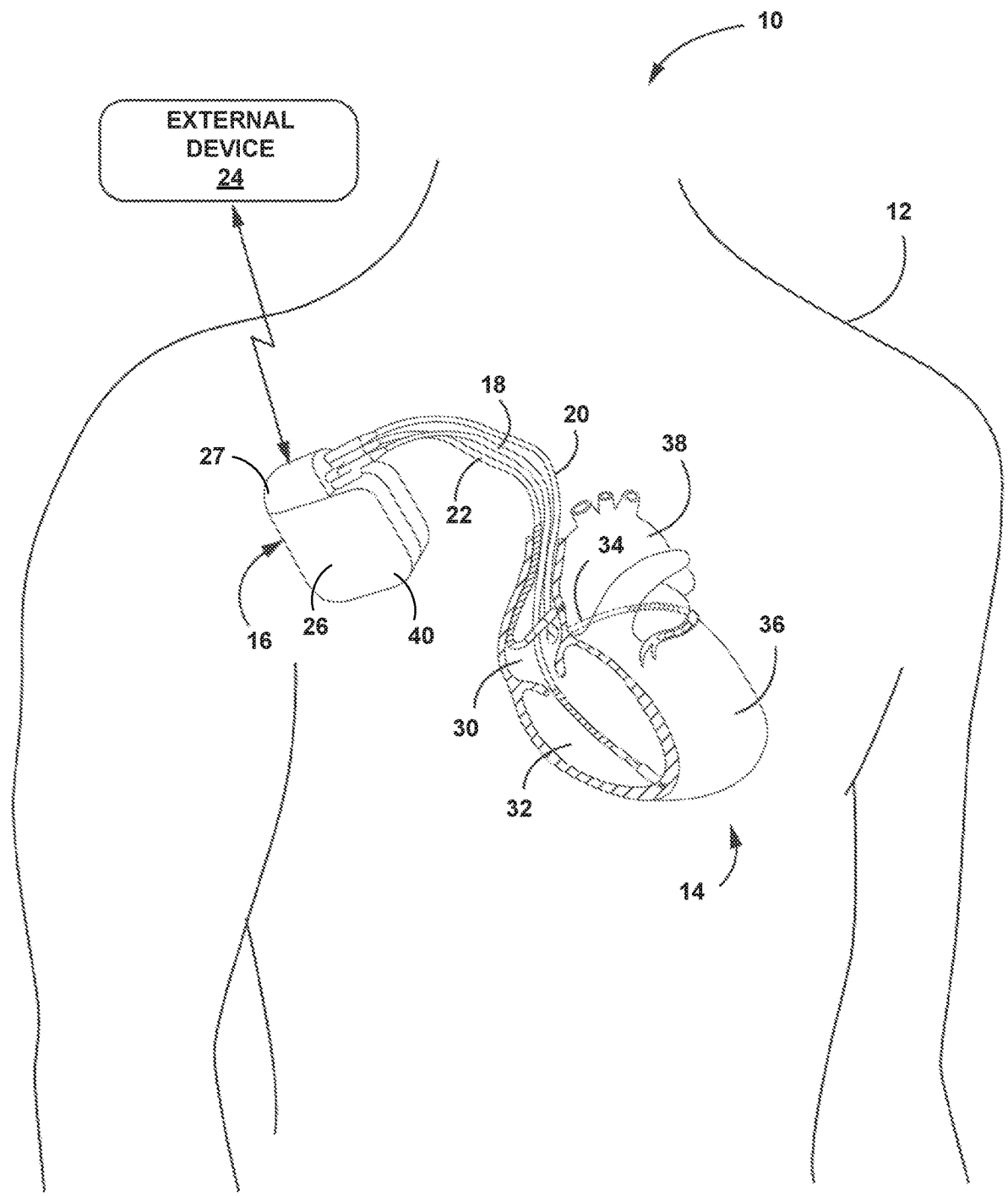
FIG. 1 is a conceptual diagram that illustrates an example medical device system that may be used to deliver therapy to a patient and/or sense one or more physiological parameters of a patient.

In general, the disclosure is directed to battery for a medical device, such as, e.g., an IMD. The battery may include electrodes and an electrolyte enclosed within a battery enclosure, which separates the internal components of the battery from the interior of the IMD housing. In some examples, the battery is a primary battery not configured to be recharged. In some examples, the battery is configured to support a relatively high rate of energy discharge relative to its capacity to, for example, support energy intensive therapy delivery, such as high energy anti-tachyarrhythmia shocks, by the IMD. In some examples, the battery has a lithium chemistry.

The electrolyte may include one or more additives configured to reduce the likelihood of a rapid voltage decline (RVD) of the battery, such as RVD as the result of short circuit caused by formation of lithium dendrites. For example, due to implantation position of the IMD within the patient and the position of the battery within the IMD, the battery may have a warm side (e.g., "hot side" facing the core of the patient) and a slightly cooler side (e.g., "cold side" facing the skin of the patient), such that a very small temperature gradient is established across the device and in turn across the battery. In a high-rate primary lithium battery this temperature gradient may lead to a thermo-diffusion coefficient effect, such as the Seebeck effect, which may cause the lithium electrode to dissolve on the cold side and lithium ions to plate on surfaces at the lithium potential on the hot side. According to the Seebeck effect in electrolytes, the different thermo-diffusion coefficients of the solvated ions in the electrolyte cause the spatial cation and anion distributions to shift with respect to each other which in turn leads to a build-up of an electrical potential difference between the hot side and the cold side of the battery. The potential difference is characteristic for a given electrode-electrolyte system and is commonly expressed as the Seebeck coefficient in units of millivolts per degree temperature difference (mV/° C.).

Within a lithium metal electrode exposed to both, the hot side and the cold side of the electrolyte, the Seebeck effect will cause an electronic current (e⁻) to flow from the cold side of the lithium to the hot side, which, in the adjacent electrolyte, is accompanied by an ionic current consisting of lithium cations (Li+). Thermochemical studies of the lithium dissolution and plating processes suggest that the plating step is rate limiting because it is endothermic and requires an activation energy for stripping the solvation shell from the lithium ion prior to plating. Lithium plating can result in the growth of lithium dendrites that can eventually produce a short circuit between anode and cathode. Since the potential differential is directly proportional to the temperature differential between hot and cold side, the lithium plating and subsequent short circuit can be accelerated by establishing a temperature gradient $\Delta T$ across the cell to drive dissolution of lithium on the cold side of the cell and plating on the hot side of the cell. To reduce rapid voltage decline, electrolyte additives may be used to change the lithium ion flow kinetics through the solid electrolyte interface layer (SEI) and thereby the structure of the plated lithium.

Figure 2:
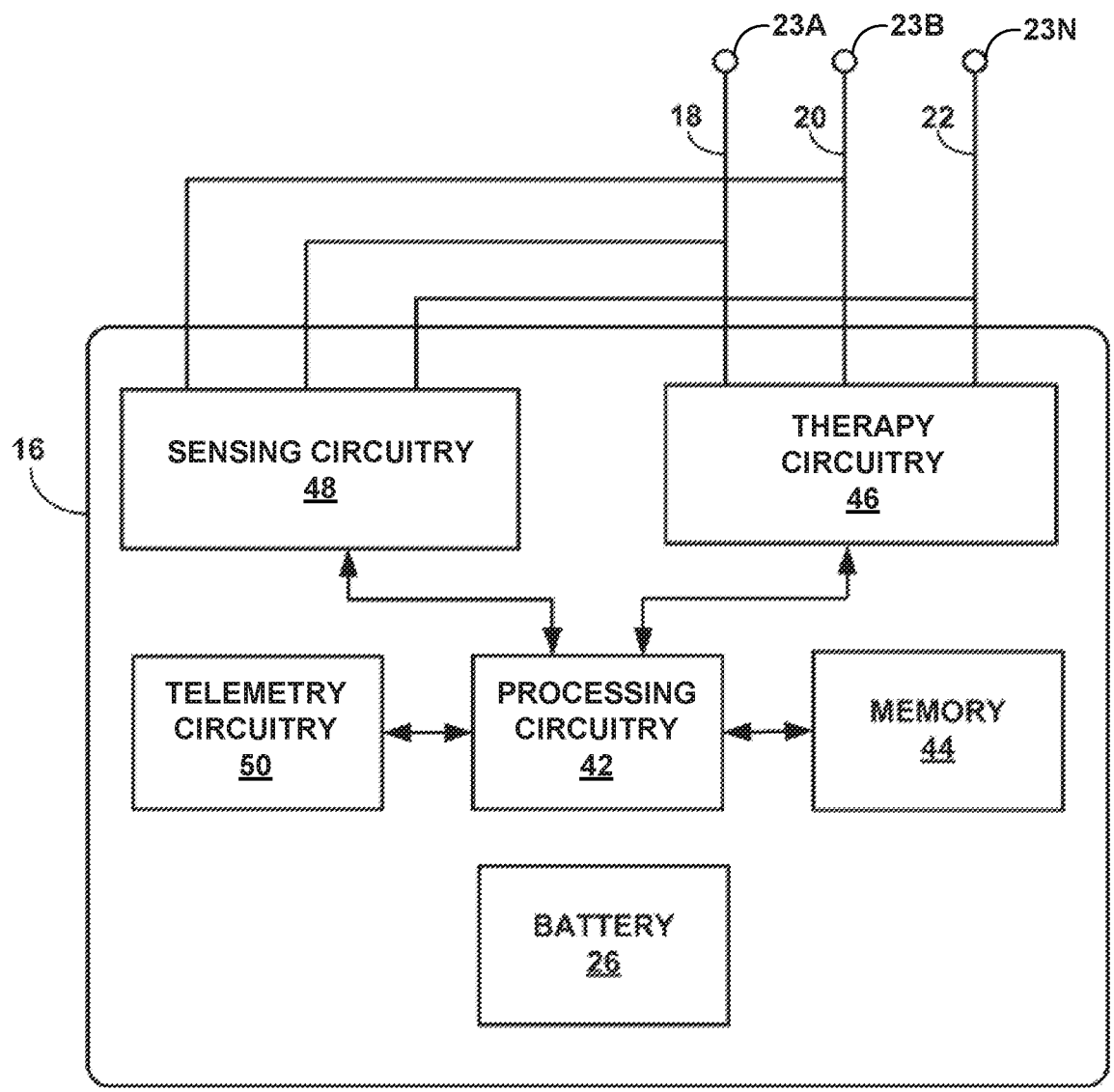
FIG. 2 is a schematic diagram illustrating components of one example IMD.

FIG. 1 is a conceptual diagram that illustrates an example medical device system 10 that may be used to provide therapy to patient 12 and/or sense physiological parameters of patient 12. Patient 12 ordinarily, but not necessarily, will be a human. Medical device system 10 may include IMD 16 and external device 24. In the example illustrated in FIG. 1, IMD 16 includes battery 26 positioned within housing 40 of IMD 16. FIG. 2 is a schematic diagram illustrating example components of IMD 16. As will be described below, battery 26 includes battery enclosure 58 (FIG. 3) in accordance with one or more examples of the disclosure.

While the examples in the disclosure are primarily directed to battery 26 employed in IMD 16, in other examples, battery 26 may be utilized with other IMDs. For example, battery 26 may be utilized with an implantable drug delivery device, an implantable monitoring device that monitors one or more physiological parameters of patient 12 without delivering therapy, or an implantable neurostimulator (e.g., a spinal cord stimulator, a deep brain stimulator, a pelvic floor stimulator, a peripheral nerve stimulator, or the like). In general, battery 26 may be attached to or implanted proximate to any medical device configured to be implanted in a body of a patient 12.

Moreover, while examples of the disclosure are primarily described with regard to IMDs, examples are not limited as such. Rather, examples of the batteries described herein may be employed in any medical device including non-implantable medical devices. For example, a battery according to some examples described herein may be employed to supply power to a medical device configured delivery therapy to a patent or sense physiological parameters of the patient externally or via a transcutaneously implanted lead or drug delivery catheter.

In the example depicted in FIG. 1, IMD 16 is connected (or "coupled") to leads 18, 20, and 22. IMD 16 may be, for example, a device that provides cardiac rhythm management therapy to heart 14, and may include, for example, an implantable pacemaker, cardioverter, and/or defibrillator that provides therapy to heart 14 of patient 12 via electrodes coupled to one or more of leads 18, 20, and 22. In some examples, IMD 16 may deliver pacing pulses, but not cardioversion or defibrillation pulses, while in other examples, IMD 16 may deliver cardioversion or defibrillation pulses, but not pacing pulses. In addition, in further examples, IMD 16 may deliver pacing pulses, cardioversion pulses, and defibrillation pulses.

IMD 16 may include electronics and other internal components necessary or desirable for executing the functions associated with IMD 16. For example, as shown in FIG. 2, in addition to battery 26, IMD 16 may include processing circuitry 42, memory 44, electrical therapy circuitry 46, sensing circuitry 48 and telemetry circuitry 50. Memory 44 of IMD 16 may include a non-transitory computer readable storage medium having instructions that, when executed by processing circuitry 42 of IMD 16, may cause it to perform various functions attributed to the device herein. For example, processing circuitry 42 of IMD 16 may control therapy circuitry 46 and sensing circuitry 48 according to instructions and/or data stored on memory to deliver therapy to patient 12 and perform other functions related to treating condition(s) of the patient with IMD 16.

Therapy circuitry 46 of IMD 16 may generate electrical signals that are delivered to patient 12 via one or more electrode(s) 23A, 23B, and 23N (collectively, "electrodes 23") on one or more of leads 18, 20, and 22, e.g., cardiac pacing signals, or cardioversion/defibrillation shocks. Sensing circuitry 48 of IMD 16 may monitor electrical signals from electrodes 23 on leads 18, 20, and 22 of IMD 16 in order to monitor electrical activity of heart 14. In one example, sensing circuitry 48 may include switching circuitry to select which of the available electrodes 23 on leads 18, 20, and 22 of IMD 16 are used to sense the heart activity. Additionally, sensing circuitry 48 of IMD 16 may include multiple detection channels, each of which may include an amplifier, as well as an analog-to-digital converter for digitizing the signal received from a sensing channel (e.g., electrogram signal processing by processing circuitry of the IMD).

Telemetry circuitry 50 of IMD 16 may include any suitable hardware, firmware, software or any combination thereof for communicating with another device, such as external device 24 (FIG. 1). Under the control of processing circuitry 42 of IMD 16, telemetry circuitry 50 may receive downlink telemetry from and send uplink telemetry to external device 24 with the aid of an antenna, which may be internal and/or external.

The various electrical components of IMD 16 may be coupled to battery 26, which may include a rechargeable or non-rechargeable (primary) battery. A non-rechargeable battery may be capable of holding a charge for several years, while a rechargeable battery may be inductively charged from an external device (e.g., on a daily or weekly basis). In general, battery 26 may supply power to one or more electrical components of IMD 16, such as, e.g., processing circuitry 42, telemetry circuitry 50, stimulation generator 48 and/or sensing circuitry 48, to allow IMD 16 to deliver therapy to patient 12, e.g., in the form of monitoring one or more patient parameters and/or delivery of electrical stimulation. Battery 26 may include an enclosure configured to physically separate the electrolyte and electrodes of battery 26 from other components within housing 40 of IMD 16.

In the example of FIG. 1, leads 18, 20, 22 that are coupled to IMD 16 may extend into heart 14 of patient 12 to sense electrical activity of heart 14 and/or deliver electrical stimulation to heart 14. In the example shown in FIG. 1, right ventricular (RV) lead 18 extends through one or more veins (not shown), the superior vena cava (not shown), and right atrium 30, and to a target region in right ventricle 32. Left ventricular (LV) coronary sinus lead 20 extends through one or more veins, the vena cava, right atrium 30, and into the coronary sinus 34 to a target region adjacent to the free wall of left ventricle 36 of heart 14. Right atrial (RA) lead 22 extends through one or more veins and the vena cava, and to a target region in right atrium 30 of heart 14. In some examples, IMD 16 may be a leadless device. For example, IMD 16 may be positioned within heart 14 at a target region. In some examples, IMD 16 may sense and deliver therapy to heart 14 from an extravascular location in addition to or instead of delivering stimulation via electrodes of intravascular leads 18, 20, 22, e.g., IMD 16 may be coupled to one or more leads that extend to substernal or other extravascular locations. In the illustrated example, there are no electrodes located in left atrium 36. However, other examples may include electrodes in left atrium 36.

IMD 16 may sense electrical signals attendant to the depolarization and repolarization of heart 14 (e.g., cardiac signals) via electrodes (not shown in FIG. 1) coupled to at least one of the leads 18, 20, and 22. In some examples, IMD 16 provides pacing pulses to heart 14 based on the cardiac signals sensed within heart 14. The configurations of electrodes used by IMD 16 for sensing and pacing may be unipolar or bipolar. IMD 16 may also deliver defibrillation therapy and/or cardioversion therapy via electrodes located on at least one of the leads 18, 20, and 22. IMD 16 may detect arrhythmia of heart 14, such as fibrillation of ventricles 32 and 36, and deliver defibrillation therapy to heart 14 in the form of electrical pulses. In some examples, IMD 16 may be programmed to deliver a progression of therapies (e.g., electrical pulses with increasing energy levels), until a fibrillation of heart 14 is stopped. IMD 16 may detect fibrillation by employing one or more fibrillation detection techniques known in the art. For example, IMD 16 may identify cardiac parameters of the cardiac signal (e.g., R-waves) and detect fibrillation based on the identified cardiac parameters).

In some examples, external device 24 may be a handheld computing device or a computer workstation. External device 24 may include a user interface that receives input from a user. The user interface may include, for example, a keypad and a display, which may be, for example, a cathode ray tube (CRT) display, a liquid crystal display (LCD) or light emitting diode (LED) display. The keypad may take the form of an alphanumeric keypad or a reduced set of keys associated with particular functions. External device 24 can additionally or alternatively include a peripheral pointing device, such as a mouse, via which a user may interact with the user interface. In some embodiments, a display of external device 24 may include a touch screen display, and a user may interact with external device 24 via the display.

A user, such as a physician, technician, or other clinician, may interact with external device 24 to communicate with IMD 16. For example, the user may interact with external device 24 to retrieve physiological or diagnostic information from IMD 16. A user may also interact with external device 24 to program IMD 16 (e.g., select values for operational parameters of IMD 16).

External device 24 may communicate with IMD 16 via wireless communication using any techniques known in the art. Examples of communication techniques may include, for example, low frequency or radiofrequency (RF) telemetry, but other techniques are also contemplated. In some examples, external device 24 may include a programming head that may be placed proximate to the patient's body near the IMD 16 implant site in order to improve the quality or security of communication between IMD 16 and external device 24.

In the example depicted in FIG. 1, IMD 16 is connected (or "coupled") to leads 18, 20, and 22. In the example, leads 18, 20, and 22 are connected to IMD 16 using the connector block 27. For example, leads 18, 20, and 22 are connected to IMD 16 using the lead connector ports in connector block 27. Once connected, leads 18, 20, and 22 are in electrical contact with the internal circuitry of IMD 16. Battery 26 may be positioned within the housing 40 of IMD 16. Housing 40 may be hermetically sealed and biologically inert. In some examples, housing 40 may be formed from a conductive material. For example, housing 40 may be formed from a material including, but not limited to, titanium, aluminum, stainless steel, among others.

Figure 3:
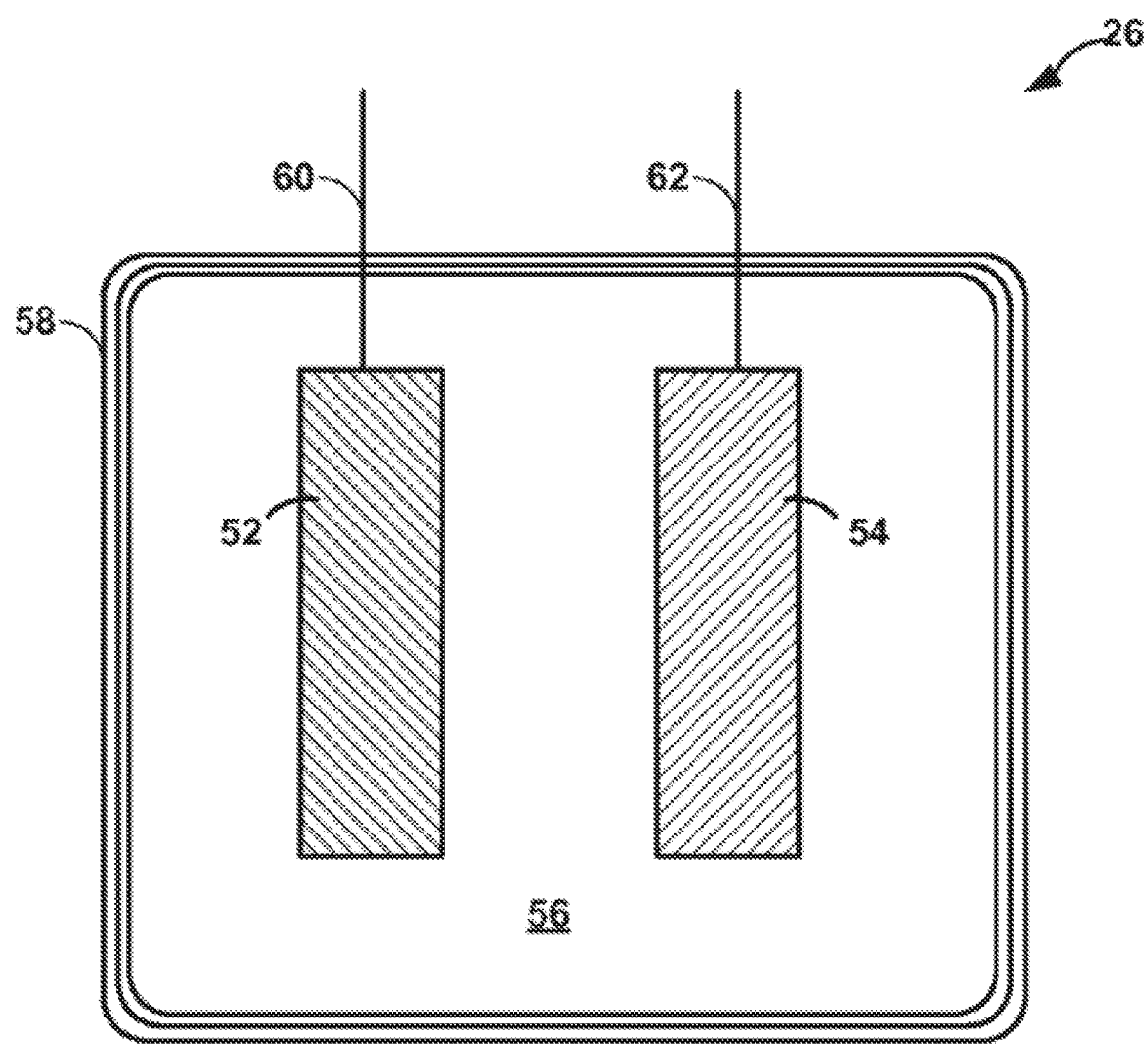
FIG. 3 is schematic diagram illustrating an example battery that may be used in a medical device.

FIG. 3 is a schematic diagram illustrating an example of battery 26 that may be used in IMD 16. As described above, battery 26 may be configured to supply power to one more electronic components of IMD 16. Battery 26 may be a lithium battery, such as a lithium metal battery or a lithium ion battery. Battery 26 includes first electrode 52, second electrode 54, and electrolyte 56. Enclosure 58 encloses these components of battery 26 to provide separation from the outside environment, e.g., the interior of housing 40 of IMD 16. In some examples, enclosure 58 may include a multi-layer enclosure. The arrangement of first electrode 52 and second electrode 54 in enclosure 58 is for illustrative purposes. In some examples, first electrode 52 and second electrode 54 may positioned within enclosure 58 in any suitable arrangement, such as a plurality of layers (of first and second electrodes), stacked, wound, folded, or combinations thereof. Metal pins 60 and 62 are electrically coupled to electrodes 52 and 54, respectively, and extend through enclosure 58 to allow for electrical connection to components outside battery enclosure 58. Metal pins 60 and 62 may be wires or rods and may also comprise foil tabs, metalized polymer, or other suitable conductor such as a material comprising carbon or a conductive ceramic such as titanium nitride. Although battery 26 is described as a lithium battery, battery 26 may take the form of other types of batteries other than a lithium battery.

First electrode 52 and second electrode 54 may each include a metal substrate and any suitable electrode composition. For example, the electrode composition of first electrode 52 may be selected such that first electrode 52 defines an anode and electrode composition of second electrode 54 may be selected such that second electrode 54 defines a cathode of battery 26. In some examples, first electrode 52 may include a lithium metal anode. In some examples, second electrode 54 may include, for example, manganese oxide or silver-vanadium oxide (SVO), or carbon monofluoride (CFx) or mixtures of CFx and SVO. The metal substrates of first and second electrodes 52, 54 may act as a current collectors and be a metal made from at least one of, but not limited to, aluminum, aluminum alloys, copper, copper alloys, titanium, titanium alloys, nickel, nickel alloys, and the like.

As seen in FIG. 3, electrolyte 56 may be provided intermediate or between first electrode 52 and second electrode 54. Electrolyte 56 may provide a medium through which ions (e.g., lithium ions) may travel. In one example, electrolyte 56 may be a liquid (e.g., a lithium salt dissolved in one or more non-aqueous solvents). In some examples, electrolyte 56 includes a mixture of dimethoxy-ethane and propylene carbonate in any suitable volume percent (vol %). In some examples, electrolyte 56 includes a lithium salt, such as $LiAsF_6$. In some examples, electrolyte 56 includes 1 molar $LiAsF_6$ in a 50/50 vol/vol % mixture of dimethoxy-ethane and propylene carbonate. Various other primary lithium battery electrolytes may be used according to other examples. For example, the lithium salt may be replaced with LiPF6 or the solvent propylene carbonate may be replaced with ethylene carbonate Although not shown FIG. 3, battery 26 may include a separator between the first electrode 52 and the second electrode 54. In some examples, the separator may include a polymeric material, such as a polypropylene/polyethylene or another polyolefin multilayer laminate that includes micropores formed therein to allow electrolyte and lithium ions to flow from one side of the separator to the other. In some examples, a solid electrolyte interface layer may be formed on the surface of either electrode adjacent to the separator. In some examples, the solid electrode interface layer may include an unsaturated cyclic carbonic acid ester, such as vinylene carbonate. Solid electrolyte interface layers may separate first electrode 52 or second electrode 54 or both from electrolyte 56, which may control the dissolution and plating or the uptake of lithium ions on the surfaces of first electrode 52 and through the surface of the second electrode 54 during charge/discharge cycles.

Figure 4:
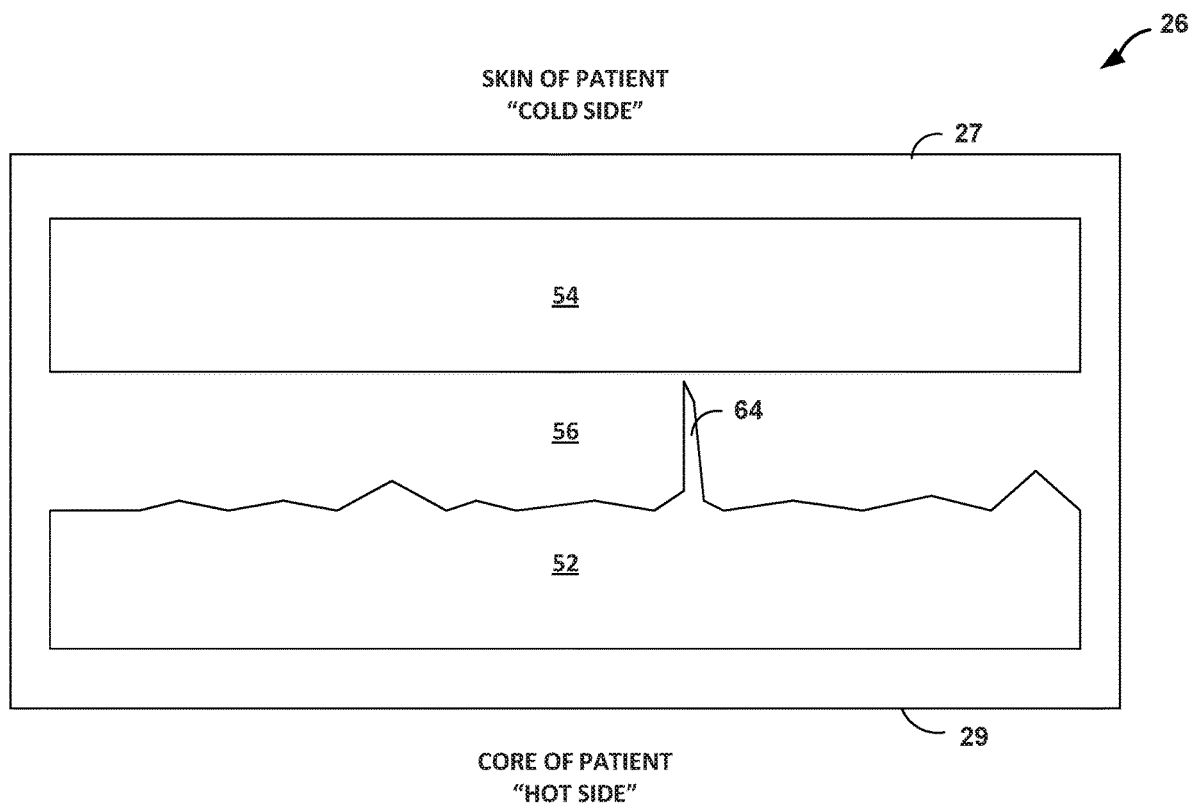
FIG. 4 is a conceptual diagram illustrating lithium dendrite in a battery.

FIG. 4 is a conceptual diagram illustrating lithium dendrite 64 in battery 26. Without being limited to a particular theory, growth of lithium dendrite 64 may be driven by an electrochemical potential gradient in battery 26. The electrochemical potential gradient may be due to a temperature gradient across battery 26. For example, when implanted in the body of patient 12, cold side 27 of battery 26 may be oriented toward (e.g., adjacent) the skin the patient 12. Hot side 29 of battery 26 may be oriented toward the core of patient 12. For example, hot side 29 may have an average temperature of about 37° C. and cold side 27 may have an average temperature of about 36° C. The temperature gradient between hot side 29 and cold side 27 may drive lithium ion flux toward hot side 29.

In examples according to this disclosure, e.g., in which electrolyte 56 includes vinylene carbonate (VC), dendrite growth on the anode may be reduced by the presence of VC in the solid electrolyte interface. The presence of VC in the solid electrolyte interfaces on anode and cathode may extend the useable life of battery 26. For example, the usable life a battery 26 without electrolyte 56 including vinylene carbonate may be within a range from about 10 to about 11 years. Including vinylene carbonate in electrolyte 56 may extend the useable life of battery 26 by between about 1% and about 10%, such as about 5%. In some examples, the amount of vinylene carbonate may affect how much the useable life of battery 26 may be extended. For example, 2 weight percent (wt %) vinylene carbonate may have a relatively smaller effect compared to 5 wt % vinylene carbonate. Similarly, 5 wt % vinylene carbonate may have a relatively smaller effect compared to 10 wt % vinylene carbonate.

Figure 5:
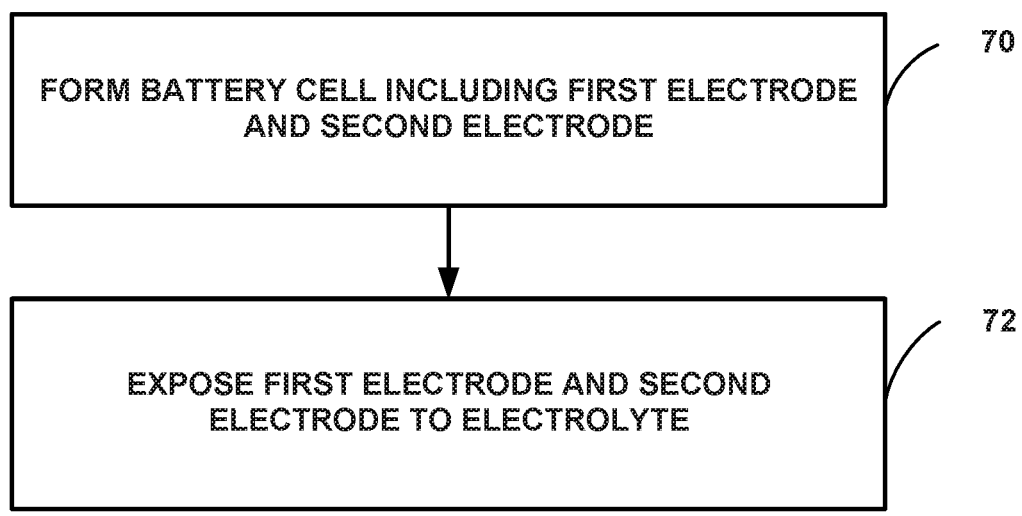
FIG. 5 is a flow diagram illustrating an example method for manufacturing an example battery.

The batteries described herein may be assembled using any suitable technique. FIG. 5 is a flow diagram illustrating an example method for manufacturing an example battery. The battery may be the same as or substantially similar to battery 26 discussed above with reference to FIGS. 1-4. Although FIG. 5 is described with respect to battery 26, in other examples, the method of FIG. 5 may be used to assemble other batteries.

The technique illustrated in FIG. 5 includes forming a battery cell including a first electrode 52 and a second electrode 54 separated a distance from first electrode 52 (70). As discussed above, first electrode 52 may include a lithium metal anode. Second electrode 54 may include a cathode. In some examples, forming the battery cell may include forming a solid electrolyte interface layer on first electrode 52 or on the second electrode 54 or both. The solid electrolyte interface layers may include vinylene carbonate.

The technique illustrated in FIG. 5 includes exposing first electrode 52 and second electrode 54 to an electrolyte 56 (72). Electrolyte 56 includes a lithium salt, an organic solvent, and an electrolyte additive. The lithium salt may include $LiAsF_6$. The organic solvent may include dimethoxy ethane and propylene carbonate. In some examples, electrolyte 56 includes 1 molar $LiAsF_6$ in a 50/50 vol/vol % mixture of dimethoxy ethane and propylene carbonate. The electrolyte additive includes vinylene carbonate. In some examples, the electrolyte additive includes at least 2 weight percent (wt. %) vinylene carbonate, such as at least 10 wt. % vinylene carbonate. In some examples, the electrolyte additive includes vinylene carbonate within a range from about 5 wt. % to about 10 wt. %.

Although not illustrated in FIG. 5, the technique may include electrically coupling first electrode 52 and second electrode 54 to IMD 16. For example, first electrode 52 and second electrode 54 may be electrically coupled to various circuitry within the housing of IMD 16. In examples in which IMD 16 includes a defibrillation device, first electrode 52 and second electrode 54 may be coupled to charge storage circuitry of the defibration device used to store energy for delivery of a defibrillation shock via one or more leads coupled to IMD 16. In some examples, the technique may include implanting battery 26, and optionally IMD 16, in a body of patient 12.

EXAMPLES

Experiments were conducted with accelerated lithium plating and subsequent short circuit by establishing a temperature gradient (ΔT) across a cell to drive dissolution or oxidation of lithium on the cold side of the cell and plating on the hot side of the cell. Eighty test stations were configured to allow evaluation of various mitigation attempts in as little time as a few days. Test cells included two types of construction: Type One and Type Two. The electrolyte system on the test cells included 1 molar $LiAsF_6$ in a 50/50 vol/vol % mixture of dimethoxy-ethane (DME) and propylene carbonate (PC).

High-rate battery cells were constructed by manufacturing as per established build plans and flood-filled with electrolyte mixtures in a dry room. The electrolytes listed in Table 1 below were used. After filling, the batteries were fill-hole sealed in the dry room and transferred back to manufacturing for button-welding and standard manufacturing testing.

After completion of manufacturing testing, the cells were mounted in a rapid voltage decline (RVD) test setup. Typically, 4 cells per electrolyte group were randomly selected and tested due to limitations in the number of available test slots.

Batteries were initially tested with a ΔT of 50° C. ($T_{hot}$=60° C.) in thermally accelerated time-to-failure testing. Batteries filled with electrolyte mixtures containing the additive vinylene carbonate that appeared to increase the time-to-failure in temperature-accelerated RVD testing were subjected to daily pulsed discharge testing using batteries filled with pure H3 (50/50 vol/vol % mixture of dimethoxyethane (DME) and propylene carbonate (PC)) as a control. In addition, microcalorimetric measurements were performed batteries filled with a promising electrolyte mix, again with pure H3 cells as controls.

TABLE 1

Electrolyte mixtures used, and the types of testing performed.

| Electrolyte | Type of testing |
|---|---|
| H3 | ΔT = 50° C. (Thot = 60° C.). 300 micro-ampere constant current + pulsed discharge through 0.65Ω load, 4 × 64 J sec, with 10 sec in between pulses, weekly. Microcalorimetry. |
| H3 + 5% w/w/vinylene carbonate (VC5%) | ΔT = 50° C. (Thot = 60° C.). Microcalorimetry. |
| H3 + 10% w/w vinylene carbonate (VC10%) | ΔT = 50° C. (Thot = 60° C.). 300 micro-ampere constant current + pulsed discharge through 0.65Ω load, 4 × 64 J, with 10 sec in between pulses, weekly. |
| H3 + 5% w/w di-benzyl-carbonate (DBC) | ΔT = 50° C. (Thot = 60° C.). |
| H3 + 5% w/w tetraglyme (TEGDME) | ΔT = 50° C. (Thot = 60° C.). |
| H3 + 5% w/w CsAsF6 | ΔT = 50° C. (Thot = 60° C.). |
| H3 + 5% w/w Cs2Co3 | ΔT = 50° C. (Thot = 60° C.). |

FIGS. 6A-6C are conceptual diagrams illustrating experimental results including the time-to-failure ("RVD Days on Test") as a function of the type of electrolyte mixture used to fill the batteries. FIG. 6A illustrates that the additive vinylene carbonate (VC) in the concentration of 5% w/w extends the time-to-failure by a factor greater than four over the standard high-rate battery pure H3 electrolyte. All other additives did not extend the time-to-failure with respect to pure H3. Therefore, the electrolyte mixture H3+VC5% was examined by pulsed discharging and microcalorimetric measurements (see below).

During weekly discharge testing, a constant current of about 300 micro-amperes was drawn from the battery and four pulses were administered weekly by pulsing the batteries through a 0.65Ω load 4 times consecutively with 10 seconds rest between pulses per week. Each pulse was terminated upon dispensing 64 J. The normalized minimum voltage during pulsing is plotted as a function of the normalized discharged capacity. The additive VC10% (*rhombi*) promotes higher pulse voltages at high discharged capacities greater than about 70% of full charge. In this way, the additive improves the performance of the battery.

TABLE 1

Microcalorimetry results of Type Two cells.

| Cell ID | Electrolyte | Heat Output (μW) | Open circuit voltage (V) |
|---|---|---|---|
| 1 | H3 + VC5% | 9 | 3.2139 |
| 2 | H3 + VC5% | 7.5 | 3.2208 |

TABLE 1-continued

Microcalorimetry results of Type Two cells.

| Cell ID | Electrolyte | Heat Output (μW) | Open circuit voltage (V) |
|---|---|---|---|
| 3 | H3 + VC5% | 9.5 | 3.217 |
| 4 | H3 | 14 | 3.2090 |
| 5 | H3 | 13 | 3.2088 |
| 6 | H3 | 14 | 3.2106 |

Table 2 illustrates that batteries filled with H3+VC5% have about a 30% lower heat output than those filled with pure H3 electrolyte. Therefore, it can be concluded that the additive VC does not promote an increase in parasitic reactions inside the battery which could contribute to parasitic lithium and, thereby, capacity loss. Rather, VC appears to lower parasitic reactions.

Figure 7A:
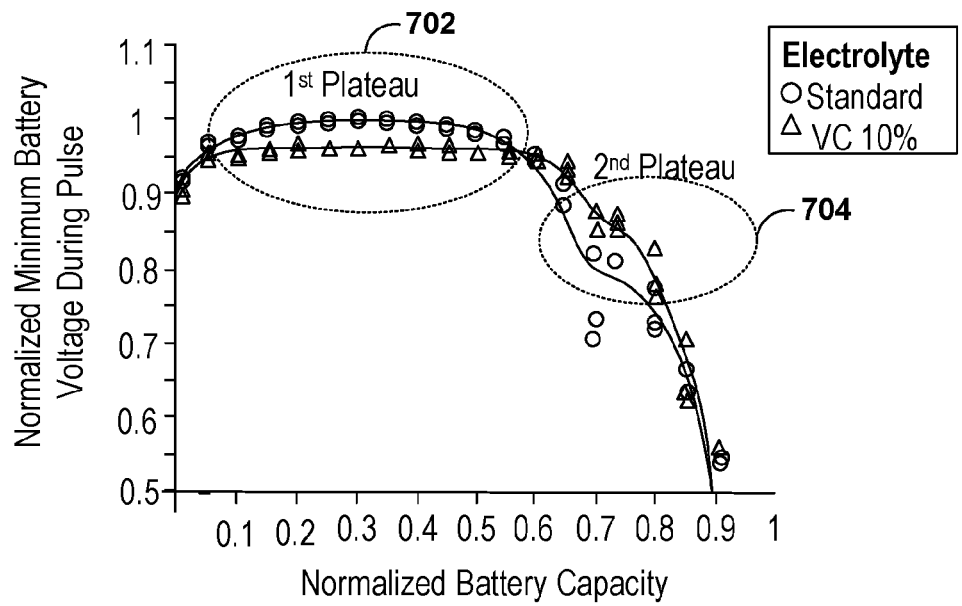
FIGS. 7A and 7B are diagrams illustrating a comparison of the discharge profiles of batteries during daily discharge testing.
Figure 7B:
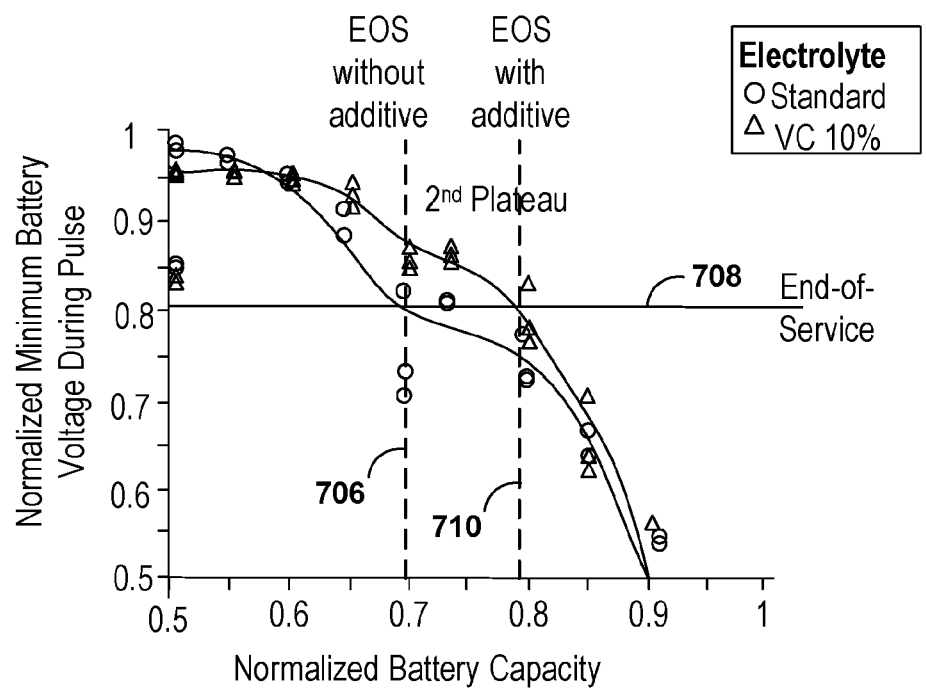

FIGS. 7A and 7B are diagrams illustrating a comparison the discharge profiles of batteries during weekly discharge testing. The discharge profiles illustrate the normalized minimum battery voltage measured during current pulsing as a function of normalized capacity. A constant background current of about 300 micro-amperes was drawn from the battery. Weekly pulse trains were generated by discharging the battery through a fixed load resistor. Each pulse was terminated after a constant amount of energy had been dispensed into the load. The data points indicate normalized minimum battery voltage during pulse versus normalized battery capacity. The circles indicate data points for batteries including a pure H3 electrolyte ("standard" electrolyte) and the triangles indicate data points for batteries with a 10% w/w vinyl carbonate (VC10%) electrolyte additive.

As illustrated in FIG. 7A, the discharge profiles include two regions. A first plateau 702 that ranges to about 60% of the normalized capacity. A second plateau 704 is observed in the capacity region between about 65% and 75%. Upon adding vinylene carbonate to the electrolyte, the battery impedance is expected to increase. Therefore, the voltage drop from the open circuit voltage is expected to increase, which in turn may result in a lower minimum voltage during the pulse in batteries with the additive. This expected result is indeed observed in the region first plateau 702. However, the 5% voltage decrease in the first plateau 702 may be inconsequential for the practical operation of a battery in an implantable medical device application because the time to deliver a given amount of energy increases only minimally.

FIG. 7B is a magnified view of the second plateau 704. Dashed vertical line 706 indicates the approximate end-of-service (EOS) point (indicated by solid horizontal line 708) for batteries operated without additive, dashed vertical line 710 indicates the EOS for batteries operated with additive in the electrolyte. Compared to first plateau 702, the opposite voltage behavior is observed in second plateau 704. For example, batteries operated with the VC10% additive in the electrolyte (triangles) retained a higher voltage during pulsing. In contrast to the slight reduction of the voltage in first plateau 704, this increase in voltage at second plateau 704 has important practical benefits. For example, second plateau 704 illustrates that the useable life (e.g., useable capacity) of the battery with VC10% additive increases by about 10% because the EOS voltage level (line 708) is reached at a discharged capacity that is 10% above the capacity found in batteries operated without additive (about 80% as indicated by the intersection of line 710 with line 708 versus about 70% as indicated by the intersection of line 706 and line 708).

The following clauses illustrate example subject matter described herein.

Clause 1. A battery for an implantable medical device (IMD), comprising: a first electrode; a second electrode separated a distance from the first electrode; an electrolyte disposed between the first electrode and the second electrode, the electrolyte comprising: a lithium salt comprising $LiAsF_6$; an organic solvent; and an electrolyte additive comprising vinylene carbonate, wherein the battery is a high-rate primary battery.

Clause 2. The battery of clause 1, wherein the electrolyte comprises at least 2 weight percent (wt. %) vinylene carbonate.

Clause 3. The battery of clause 1, wherein the electrolyte comprises at least 10 wt. % vinylene carbonate.

Clause 4. The battery of clause 1, wherein the electrolyte comprises vinylene carbonate within a range from about 5 wt. % to about 10 wt. %.

Clause 5. The battery of any one of clauses 1 through 4, wherein the first electrode comprises a lithium metal anode.

Clause 6. The battery of any one of clauses 1 through 5, wherein the organic solvent comprises dimethoxy ethane and propylene carbonate.

Clause 7. The battery of any one of clauses 1 through 6, wherein the electrolyte comprises 1 molar $LiAsF_6$ in a 50/50 vol/vol % mixture of dimethoxy ethane and propylene carbonate.

Clause 8. The battery of any one of clauses 1 through 7, further comprising a solid electrolyte interface layer formed on the first electrode, wherein the solid electrolyte interface layer comprises vinylene carbonate.

Clause 9. The battery of clause 8, wherein the electrolyte additives, during operation of the battery, changes lithium ion flow kinetics through the solid electrolyte interface layer to reduce formation of lithium dendrites on the first electrode.

Clause 10. The battery of any one of clauses 1 through 9, wherein the battery is a high-rate primary lithium metal battery.

Clause 11. A medical device comprising: an outer housing; and a high-rate primary battery within the outer housing, wherein the high-rate primary battery is configured to supply power to one or more electronic components of the medical device, and wherein the high-rate primary battery comprises: a first electrode; a second electrode separated a distance from the first electrode; an electrolyte disposed between the first electrode and the second electrode, the electrolyte comprising: a lithium salt comprising $LiAsF_6$; an organic solvent; and an electrolyte additive comprising vinylene carbonate.

Clause 12. The medical device of clause 11, wherein the electrolyte comprises at least 2 weight percent (wt. %) vinylene carbonate.

Clause 13. The medical device of clause 11, wherein the electrolyte comprises at least 10 wt. % vinylene carbonate.

Clause 14. The medical device of clause 11, wherein the electrolyte comprises vinylene carbonate within a range from about 5 wt. % to about 10 wt. %.

Clause 15. The medical device of any one of clauses 11 through 14, wherein the first electrode comprises a lithium metal anode.

Clause 16. The medical device of any one of clauses 11 through 15, wherein the organic solvent comprises dimethoxy ethane and propylene carbonate.

Clause 17. The medical device of any one of clauses 11 through 16, wherein the electrolyte comprises 1 molar $LiAsF_6$ in a 50/50 vol/vol % mixture of dimethoxy ethane and propylene carbonate.

Clause 18. The medical device of any one of clauses 11 through 17, further comprising a solid electrolyte interface layer formed on the first electrode, wherein the solid electrolyte interface layer comprises vinylene carbonate.

Clause 19. The medical device of clause 18, wherein the electrolyte additives, during operation of the high-rate primary battery, changes lithium ion flow kinetics through the solid electrolyte interface layer to reduce the voltage drop in the second plateau region of the discharge profile and the formation of lithium dendrites on the first electrode.

Clause 20. The medical device of any one of clauses 11 through 19, wherein the high-rate primary battery is a high-rate primary lithium metal battery.

Clause 21. The medical device of any one of clauses 11 through 20, wherein the medical device is configured to be implantable in a body of a patient.

Clause 22. The medical device of any one of clauses 11 through 21, wherein the medical device is configured to provide cardiac rhythm management therapy to a heart of a patient.

Clause 23. A method of assembling a battery comprising: forming a high-rate primary battery cell including a first electrode and a second electrode separated a distance from the first electrode; and exposing the first electrode and the second electrode to an electrolyte comprising: a lithium salt comprising $LiAsF_6$; an organic solvent; and an electrolyte additive comprising vinylene carbonate.

Clause 24. The method of clause 23, wherein the electrolyte comprises at least 2 weight percent (wt. %) vinylene carbonate.

Clause 25. The method of clause 23, wherein the electrolyte comprises at least 10 wt. % vinylene carbonate.

Clause 26. The method of clause 23, wherein the electrolyte comprises vinylene carbonate within a range from about 5 wt. % to about 10 wt. %.

Clause 27. The method of any one of clauses 23 through 26, wherein the first electrode comprises a lithium metal anode.

Clause 28. The method of any one of clauses 23 through 27, wherein the organic solvent comprises dimethoxy ethane and propylene carbonate.

Clause 29. The method of any one of clauses 23 through 28, wherein the electrolyte comprises 1 molar $LiAsF_6$ in a 50/50 vol/vol % mixture of dimethoxy ethane and propylene carbonate.

Clause 30. The method of any one of clauses 23 through 29, further comprising forming a solid electrolyte interface layer formed on the first electrode, wherein the solid electrolyte interface layer comprises vinylene carbonate.

Clause 31. The method of clause 30, wherein the electrolyte additives, during operation of the high-rate primary battery cell, changes lithium ion flow kinetics through the solid electrolyte interface layer to reduce the voltage drop in the second plateau region of the discharge profile and the formation of lithium dendrites on the first electrode.

Clause 32. The method of any one of clauses 23 through 31, wherein the high-rate primary battery is a high-rate primary lithium metal battery.

Clause 33. The method of any one of clauses 23 through 32, further comprising electrically coupling the first electrode and the second electrode to an implantable medical device.

Clause 34. The method of any one of clauses 23 through 33, further comprising implanting the high-rate primary battery in a body of a patient.

Various examples of the disclosure have been described. Any combination of the described systems, operations, or functions is contemplated. These and other examples are within the scope of the following claims.

What is claimed is:

1. A battery comprising:
   a first electrode;
   a second electrode separated a distance from the first electrode;
   an electrolyte disposed between the first electrode and the second electrode, the electrolyte comprising:
      a lithium salt comprising $LiAsF_6$;
      an organic solvent; and
      an electrolyte additive comprising vinylene carbonate,
   wherein the battery is a high-rate primary battery, and
   wherein the electrolyte comprises vinylene carbonate within a range from about 5 wt. % to about 10 wt. %.

2. The battery of claim 1, wherein the first electrode comprises a lithium metal anode.

3. The battery of claim 1, wherein the organic solvent comprises dimethoxy ethane and propylene carbonate.

4. The battery of claim 1, wherein the electrolyte comprises 1 molar $LiAsF_6$ in a 50/50 vol/vol % mixture of dimethoxy ethane and propylene carbonate.

5. The battery of claim 1, further comprising a solid electrolyte interface layer formed on the first electrode, wherein the solid electrolyte interface layer comprises vinylene carbonate.

6. The battery of claim 5, wherein the electrolyte additives additive, during operation of the battery, is configured to change changes lithium ion flow kinetics through the solid electrolyte interface layer to reduce the formation of lithium dendrites on the first electrode and voltage drop in a second plateau region of a discharge profile.

7. The battery of claim 1, wherein the battery is a high-rate primary lithium metal battery.

8. A medical device comprising:
   an outer housing; and
   a high-rate primary battery within the outer housing, wherein the high-rate primary battery is configured to supply power to one or more electronic components of the medical device, and wherein the high-rate primary battery comprises:
      a first electrode;
      a second electrode separated a distance from the first electrode;
      an electrolyte disposed between the first electrode and the second electrode, the electrolyte comprising:
         a lithium salt comprising $LiAsF_6$;
         an organic solvent; and
         an electrolyte additive comprising vinylene carbonate,
      wherein the electrolyte comprises vinylene carbonate within a range from about 5 wt. % to about 10 wt. %.

9. The medical device of claim 8, wherein the medical device is configured to be implantable in a body of a patient.

10. The medical device of claim 8, wherein the battery is configured to supply operation power to the medical device for provision of cardiac rhythm management therapy to a heart of a patient.

11. A method of assembling a battery, the method comprising:
   forming a high-rate primary battery cell including a first electrode and a second electrode separated a distance from the first electrode; and
   exposing the first electrode and the second electrode to an electrolyte comprising:
      a lithium salt comprising $LiAsF_6$;
      an organic solvent; and
      an electrolyte additive comprising vinylene carbonate,
   wherein the electrolyte comprises vinylene carbonate within a range from about 5 wt. % to about 10 wt. %.

12. The method of claim 11, further comprising forming a solid electrolyte interface layer formed on the first electrode, wherein the solid electrolyte interface layer comprises vinylene carbonate.

13. The method of claim 12, wherein the electrolyte additive, during operation of the high-rate primary battery cell, is configured to change lithium ion flow kinetics through the solid electrolyte interface layer to reduce voltage drop in a second plateau region of a discharge profile and formation of lithium dendrites on the first electrode.

14. The medical device of claim 11, wherein the first electrode
   comprises a lithium metal anode.

15. The medical device of claim 8, wherein the organic solvent comprises dimethoxy ethane and propylene carbonate.

16. The medical device of claim 8, wherein the electrolyte comprises 1 molar $LiAsF_6$ in a 50/50 vol/vol % mixture of dimethoxy ethane and propylene carbonate.

17. The medical device of claim 8, further comprising a solid electrolyte interface layer formed on the first electrode, wherein the solid electrolyte interface layer comprises vinylene carbonate.

18. The medical device of claim 17, wherein the electrolyte additive is configured to, during operation of the high-rate primary battery, change lithium ion flow kinetics through the solid electrolyte interface layer to reduce voltage drop in a second plateau region of a discharge profile and the formation of lithium dendrites on the first electrode.

19. The medical device of claim 8, wherein the high-rate primary battery is a high-rate primary lithium metal battery.

* * * * *